United States Patent [19]

Haston et al.

[11] Patent Number: 5,372,328
[45] Date of Patent: Dec. 13, 1994

[54] RESTRAINT BELT RETRACTOR

[75] Inventors: David V. Haston, Glendora; John A. Churilla, Riverside, both of Calif.

[73] Assignee: Pacific Scientific Company, Newport Beach, Calif.

[21] Appl. No.: 32,798

[22] Filed: Mar. 17, 1993

Related U.S. Application Data

[63] Continuation-in-part of Ser. No. 787,382, Nov. 4, 1991, Pat. No. 5,312,066.

[51] Int. Cl.⁵ .......................................... B65H 75/48
[52] U.S. Cl. .................................................. 242/383.3
[58] Field of Search ......... 242/107, 107.4 R, 107.4 A, 242/107.4 B, 383.3; 280/806, 807, 808

[56] References Cited

U.S. PATENT DOCUMENTS

| | | | |
|---|---|---|---|
| 3,203,641 | 8/1965 | McFarlane et al. | 242/107.4 A |
| 3,335,974 | 8/1967 | Glauser et al. | |
| 3,343,763 | 9/1967 | Spouge | 242/107.4 A |
| 3,402,899 | 9/1968 | Wright, Jr. et al. | |
| 3,482,799 | 12/1969 | Wrighton et al. | 242/107.4 B |
| 3,510,085 | 5/1970 | Stoffel | 242/107.4 B |
| 3,770,225 | 11/1973 | Boblitz | 242/107.4 R |
| 3,851,835 | 12/1974 | Fohl | 242/107.4 B |
| 3,967,794 | 7/1976 | Fohl | 242/107.4 R |
| 4,148,446 | 4/1979 | Sugar | |
| 4,278,216 | 7/1981 | Takada | 242/107.4 B X |
| 4,392,619 | 7/1983 | Fohl | |
| 4,393,995 | 7/1983 | Tsukamoto | 242/107.4 B X |
| 4,461,434 | 7/1984 | Butenop | |
| 4,508,289 | 4/1985 | Singer et al. | |
| 4,509,707 | 4/1985 | Ernst et al. | |
| 4,518,131 | 5/1985 | Butenop et al. | |
| 4,562,977 | 1/1986 | Hollowell | |
| 4,564,155 | 1/1986 | Tsukamoto | 242/107.4 B X |
| 4,618,108 | 10/1986 | Butenop et al. | |
| 4,619,418 | 10/1986 | Butenop | |
| 4,645,138 | 2/1987 | Kapanka | 242/107.4 B X |
| 4,727,640 | 3/1988 | Hollowell | |
| 4,902,041 | 2/1990 | Corbett et al. | 242/76 X |
| 4,925,124 | 5/1990 | Moyt et al. | 242/107.4 B X |
| 4,979,694 | 12/1990 | Grabinski et al. | |

FOREIGN PATENT DOCUMENTS

| | | |
|---|---|---|
| 2297062 | 8/1976 | France . |
| 2304361 | 10/1976 | France . |
| 2395761 | 1/1993 | France . |
| 1556440 | 2/1970 | Germany . |
| 1039101 | 8/1966 | United Kingdom . |
| 2047516 | 12/1980 | United Kingdom ......... 242/107.4 R |

*Primary Examiner*—Stanley N. Gilreath
*Assistant Examiner*—John P. Darling
*Attorney, Agent, or Firm*—Knobbe, Martens, Olson & Bear

[57] ABSTRACT

A shaft on which a restraint belt is wound is rotatably mounted in the side walls of a U-shaped frame. A plastic belt guide is connected by side arm belt edge protectors to tubular flanges that form bushings for the shaft. A driving hub mounted on the shaft drives a locking hub through a clutch formed of ball bearings mounted in recesses in the faces of the hubs. Belt payout rotation of the shaft at a predetermined acceleration will cause the locking hub to rotationally lag. This causes the locking hub to move axially and further causes locking teeth on the locking hub to engage holes in the sidewall of the frame. This prevents further rotation until the belt extension load on the belt is removed. A synchronization spring arrests rotation of the locking hub as it moves axially into locking position.

10 Claims, 7 Drawing Sheets

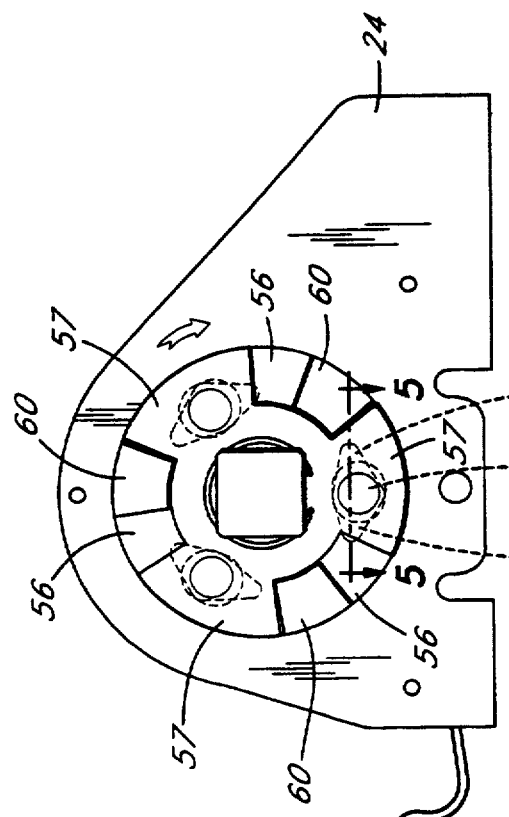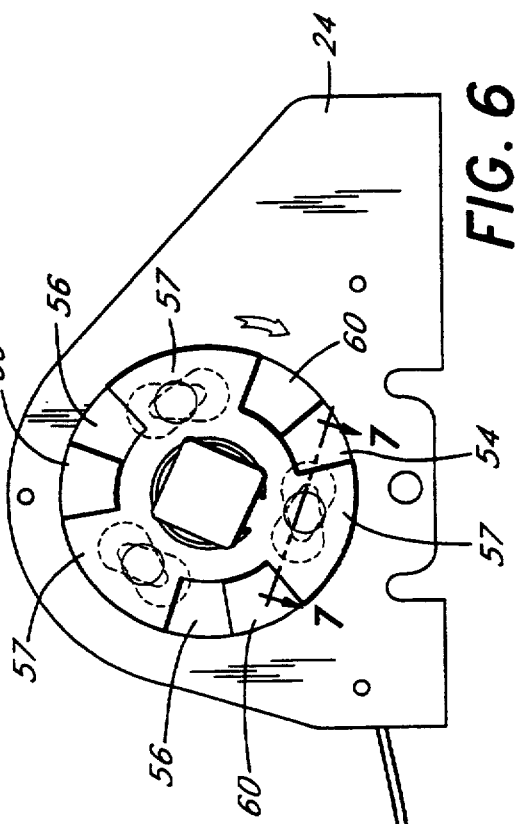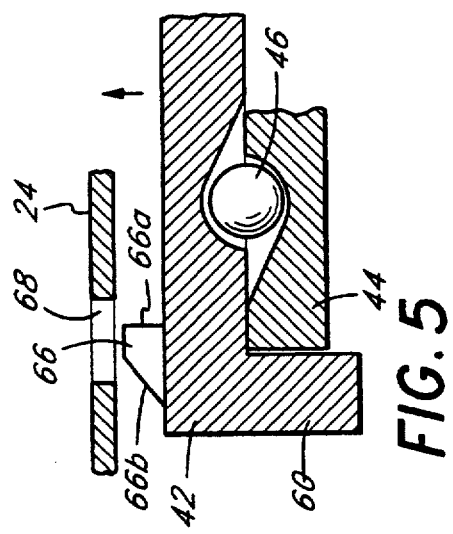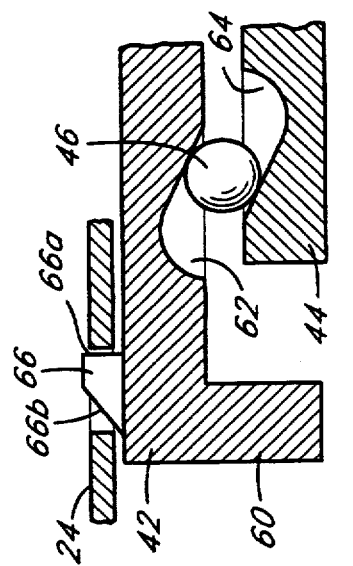

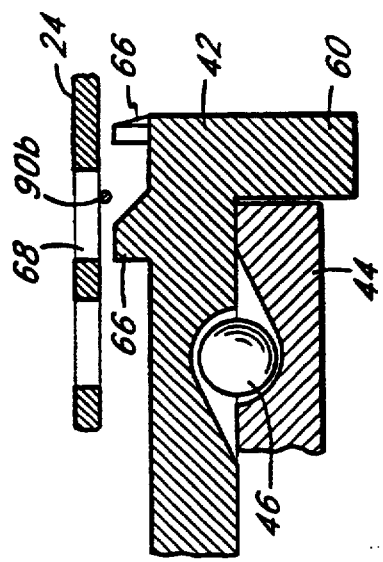
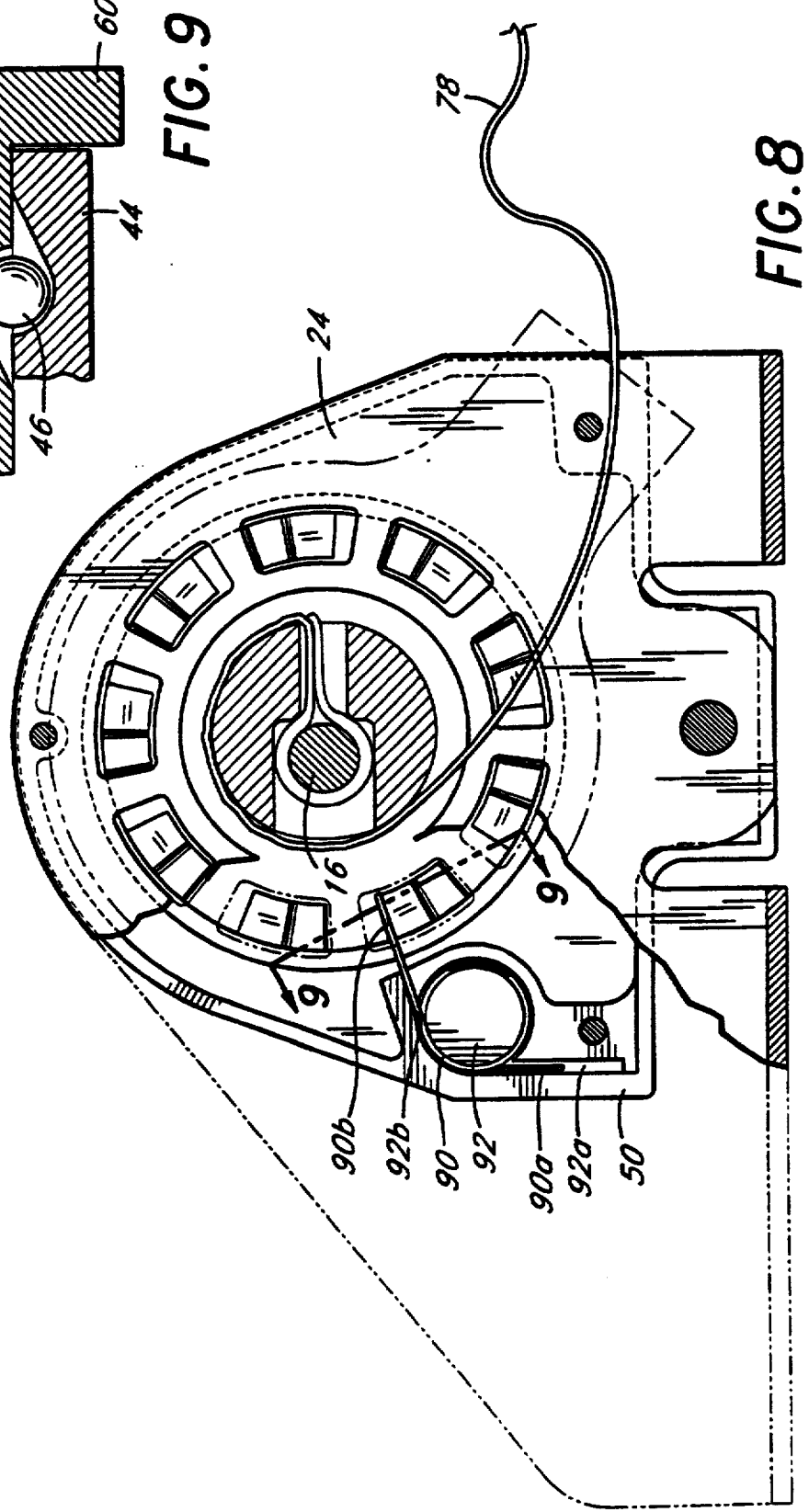

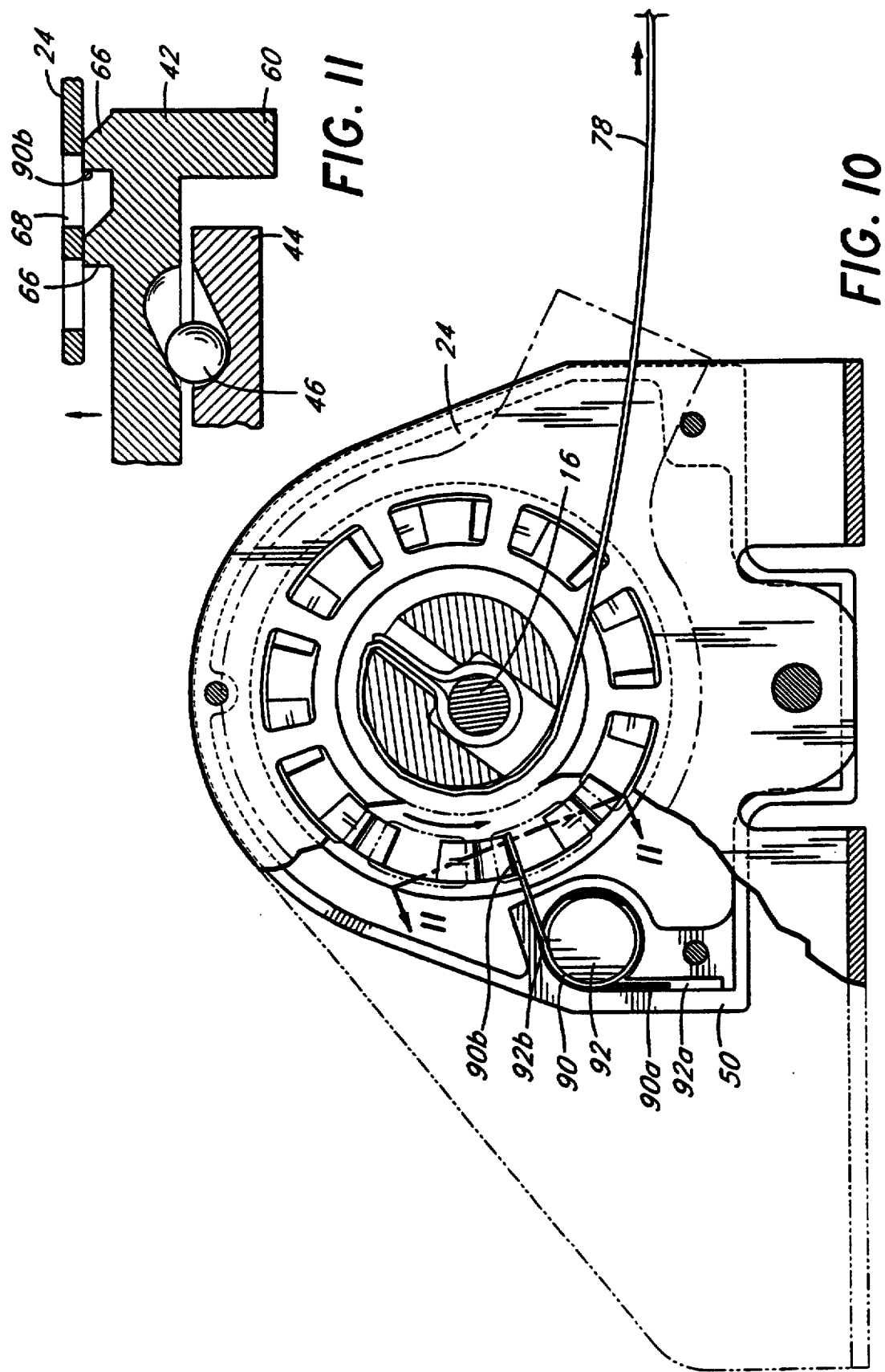

RESTRAINT BELT RETRACTOR

RELATED CASES

This application is a continuation-in-part of U.S. patent application Ser. No. 07/787,382, filed Nov. 4, 1991 now U.S. Pat. No. 4,312,066, issued May 17, 1994.

FIELD OF THE INVENTION

The present invention relates to safety belt retractors which are used in vehicles to restrain an occupant in the seat in the event of an emergency.

BACKGROUND OF THE INVENTION

Vehicle safety belts typically include a retractor mechanism which causes the belt to automatically wind onto a spring loaded reel when not in use. The retractor also insures that the belt remains flush against the person's body as the person changes seated positions, thus allowing the person to move freely without having to manually adjust the belt. In order to secure the person in the event of an emergency, the retractor also has a locking mechanism which senses the emergency condition and locks the reel, thus preventing further extension of the belt and keeping the person secured against the seat.

Typically a retractor responds in an emergency situation by sensing the deceleration of the vehicle, or the rotational acceleration of the reel. In an example of an acceleration sensing mechanism a freely rotating inertia element senses the belt unwinding, angular acceleration of the reel. As the reel accelerates, the rotation of the inertia element lags behind the rotation of the reel assembly. The relative change in position causes the inertia element to move a locking or braking mechanism into position and brake the reel. Some retractors, have locking means which respond to both the acceleration of the belt and the deceleration of the vehicle.

The locking mechanism in some prior art involves a ratchet attached to one or both sides of the reel which is surrounded by teeth. There is also either a bar or a pawl which is capable of locking the reel by engaging the ratchet teeth, and which moves into this locking position upon sensing the emergency condition. The ratchet teeth may be located either on the radial interior or exterior relative to the retractor housing. That is, the ratchet may be designed as a wheel with teeth pointing outward on the outside of the wheel or as a ring with teeth pointing inward on the inner circumference of the ring. Inwardly extending teeth or locking elements offer certain advantages, but such systems have other complexities concerning the mounting of components.

Thus it is desirable that the retractor have a minimum number of parts, be compact and of course be reliable and inexpensive. In this regard it is desirable to eliminate parts by having some elements perform dual functions. One example of this is to have reel locking holes formed in a reel frame rather than a separate element. In one such arrangement, a rotating inertia mass having axially extending teeth or lugs is moved axially in response to a predetermined acceleration causing the teeth to enter locking holes in the frame. In some instances, the locking teeth may only partially move into the locking holes while the inertia mass is still rotating at a significant velocity such that the inertia mass may not be immediately stopped, and the tips of the teeth may be damaged. Thus a need exists to insure that the teeth are always properly aligned when the inertia mass is moved axially to enter the locking holes. U.S. Pat. No. 3,979,083-Fohl discloses one such arrangement, but it is somewhat complex and a simplified arrangement is desired.

SUMMARY OF THE INVENTION

The present invention relates to an improved safety belt retractor directed toward improving the performance and reducing the manufacturing costs associated with the prior art. The invention comprises a frame, preferably U-shaped, and a reel or reel shaft which rotates on its axis within the frame. A safety belt is wound on the reel and a conventional power spring or other means urges the belt to recoil onto the reel. A locking assembly which is driven by the reel shaft is responsive to the relative rotation between the reel and an inertia element that causes the reel to lock. That is, further strap payout is prevented when a function of the reel such as angular acceleration reaches a predetermined threshold. The locking mechanism includes a locking hub having one or more teeth that correspond to one or more holes in the frame. The reel locks when the teeth enter the holes in the frame. This arrangement reduces the number of parts for the retractor since no special pawl or lock bar is needed to halt the reel or to mount the reel. It is the frame itself that directly receives the locking load and directly supports the reel.

In accordance with one aspect of the invention, the set of teeth and corresponding holes are spaced around the shaft of the reel in a circle. This provides many points of contact which are simultaneously engaged when the shaft is locked.

In accordance with another aspect of the invention, the locking mechanism comprises two hubs which are connected to the shaft of the reel. An outer hub is mounted to always rotate with the shaft. An inertia locking hub may rotate on the shaft and therefore change its angular position with respect to the fixed outer hub. The toothed inertia hub may also slide axially along the shaft, but it is normally urged toward the fixed hub by a spring so that locking teeth on the inertia hub do not engage locking teeth formed by holes in the frame. A set of bearings which lie in recesses between the hubs transmit rotation to the inertia hub. The recesses are shaped such that when the inertia of the inertia hub causes it to lag rotationally with respect to the fixed hub, the ball bearings start to roll out of the recesses pushing the inertia hub axially on the shaft to cause its lock teeth to enter the frame lock holes. Interengaging lugs on the hubs permit limited relative rotation between the hubs, but the locked inertia hub quickly prevents rotation of the outer hub and thereby locks the reel shaft.

To insure that the teeth on the locking hub are properly aligned with the locking holes in the frame when the locking hub is being moved axially towards the frame, there is provided a flexible element, in the form of an end tang of a coil spring to arrest rotation of the locking hub as it moves axially. The spring tang extends generally radially in a plane adjacent to the ring of locking holes formed in the frame. When the locking hub is rotating at an acceleration below a locking threshold, the tips of the locking lugs or teeth are rotated adjacent the plane of the flexible element, but the flexible element does not interfere with such rotation. However, when the locking hub starts to move axially, the tip of one of the locking teeth will engage the spring tang causing rotation of the locking hub to be interrupted. The locking hub continues to move axially as a result of the continued rotation of the driving hub. The spring end is located so that when the rotation of the locking hub is arrested, its teeth are aligned or synchronized with the locking holes. Thus the locking hub teeth are smoothly and quickly guided into the locking holes. Preferably the coil spring having the flexible tang is conveniently positioned in an end cap covering the locking mechanism, and one end of the spring is anchored in the end cap.

In accordance with another aspect of the invention, the retractor has a strap guide, preferably made of plastic, which has a front part that spans the width of frame and two side arms to mount it on the frame. The front part has a slot through which the belt passes in order to insure proper coiling of the belt. The support arms each have a hole with an annular flange that extends into the frame holes, and the reel shaft extends through the flanges. The flanges thus form bearings for the reel shaft, and the shaft in turn positions the belt guide. This minimizes the number of parts because the strap guide is fastened to the frame without any extra parts and no separate bushing for the reel shaft is required. The frame teeth, which lock the inertia hub, surround the shaft, spaced radially outwardly from the flange bearings.

BRIEF DESCRIPTION OF THE DRAWINGS

FIG. 4 is a schematic side elevational view illustrating a portion of the retractor in its unlocked position.

FIG. 5 is a cross section on line 5—5 of FIG. 4.

FIG. 6 is a view similar to FIG. 4 with the retractor in its locked position.

FIG. 7 is a cross section on line 7—7 of FIG. 6.

FIG. 8 is a cross-sectional view on line 8—8 of FIG. 1 with portions of the frame cut away.

FIG. 9 is a cross-sectional view on line 9—9 of FIG. 8.

FIG. 10 is a cross-sectional view similar to FIG. 8 after the locking hub has been moved into engagement with the frame and the synchronizing spring.

FIG. 11 is a cross-sectional view on lines 11—11 of FIG. 10.

DETAILED DESCRIPTION OF THE PREFERRED EMBODIMENT

Figure 1:
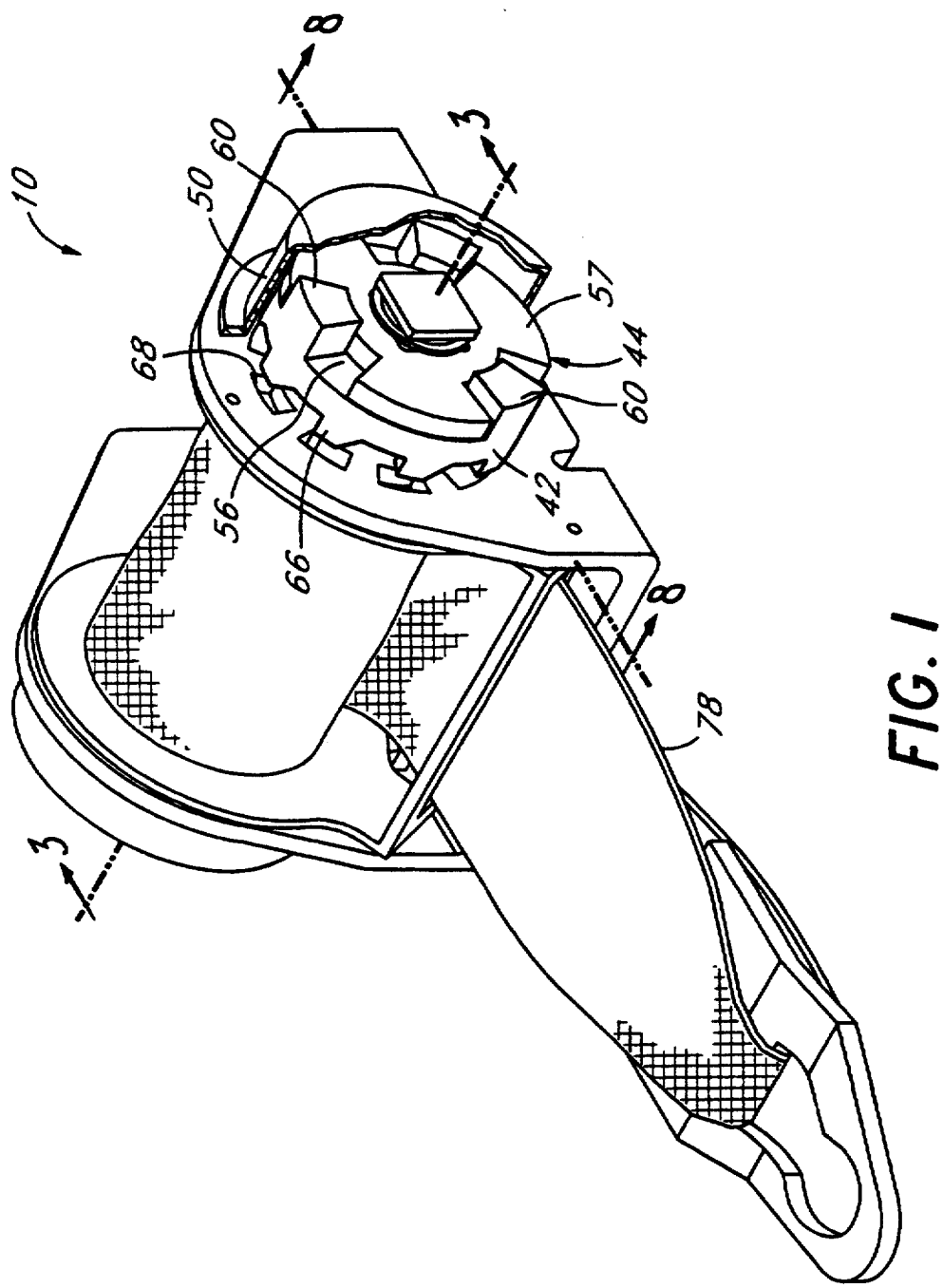
FIG. 1 is a perspective view of an exemplary retractor embodying the present invention.
Figure 2:
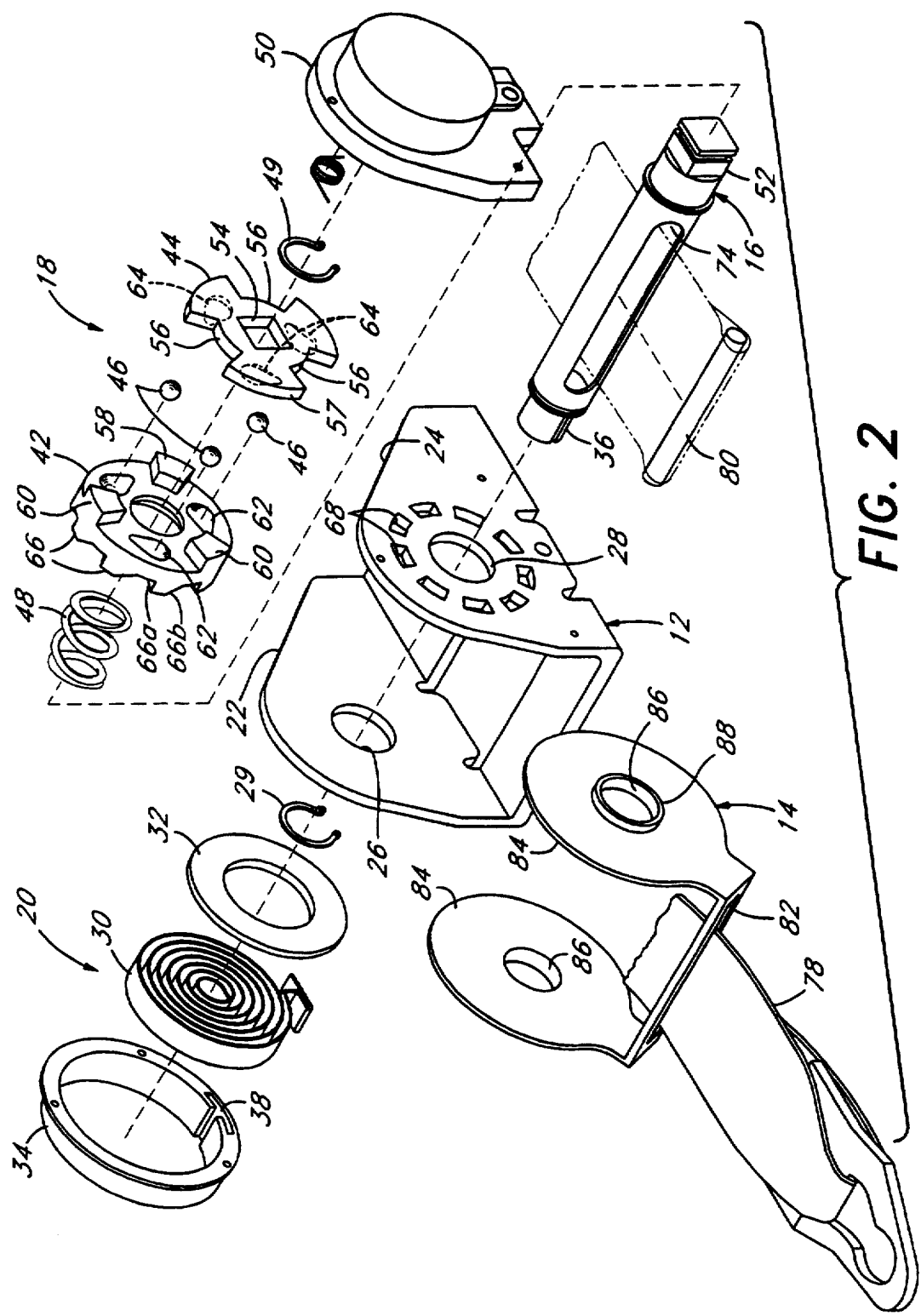
FIG. 2 is an exploded perspective view of the retractor of FIG. 1.
Figure 3:
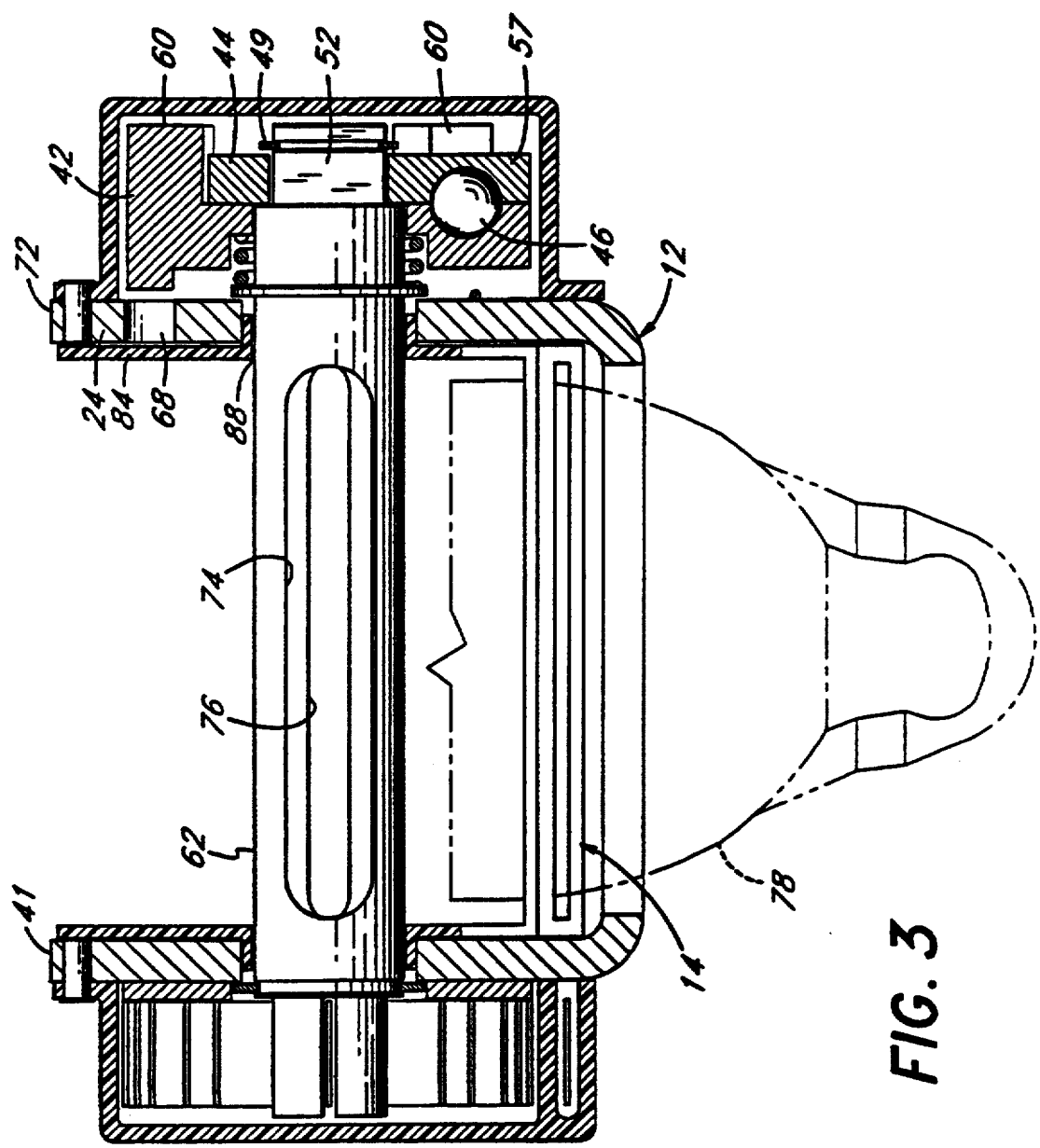
FIG. 3 is a front cross-sectional view of the retractor on line 3—3 of FIG. 1.

Referring to the drawings, there is shown a safety belt retractor 10 which comprises a U-shaped frame 12, a belt guide 14, a reel shaft 16, a locking assembly 18, and a recoil assembly 20. The frame 12 comprises a bottom wall 21 and a pair of spaced, upstanding sidewalls 22 and 24, each of which has a center hole 26 and 28. The reel shaft 16 extends between the sidewalls 22 and 24 of the frame 12 and through the holes 26 and 28. It is held in place by a snap-on retaining ring 29.

The belt guide 14 is a plastic component comprising a generally flat front piece 82 and two disk-shaped side arms 84. The front piece 82 has a slot through which the belt 78 passes as it uncoils from the retractor 10. The side arms 84 rest against the inner surfaces of the frame sidewalls 22 and 24. Each side arm 84 has a center hole 86 with an axially extending, annular flange 88 which protrudes outward from the sidearm. The flanges 88 fit into the center holes 26, 28 in the sidewalls 22, 24 of the frame 12 and serve as a bushing between the reel shaft 16 and the frame 12, thus eliminating the need for separate bearings or bushings. The belt guide bushings 88 can rotate in the frame and the shaft rotates within the bushings.

The locking assembly 18 is located on the outer side of the sidewall 24 on one end of the reel shaft 16. The recoil assembly 20 is located on the outer side of the other sidewall 22. The reel shaft 16 and the locking assembly 18 rotate freely on the frame 12.

The recoil assembly 20 comprises a power spring 30, a washer 32, and a plastic cover 34. One end of the torsion spring 30, which is located in the center, is inserted into a slot 36 on the end of the reel shaft 16. The other end of the torsion spring 30, which is located at the outer circumference of the spring, is inserted into a slot 38 in the cover 34. The spring 30 is wound as the reel shaft 16 rotates in the belt unwinding direction, causing the reel shaft to be biased toward an angular position in which the power spring 30 is unwound.

The locking assembly 18 comprises a locking hub 42, an outer driving hub 44, three ball bearings 46, a calibration, compression spring 48 and a retaining ring 49. A plastic cover or cap 50 attached to the frame 12 encloses the assembly 18. The locking end 52 of the reel shaft 16 is formed with a square cross-section. The outer hub 44 has a corresponding square hole 54 in its center, allowing the hub 44 to be drivingly connected onto the end 52 of the reel shaft 16. This ensures that the hub 44 and the reel shaft 16 will not rotate relative to each other. The retaining ring 49 snaps onto the end 52 of the reel shaft 16 and secure the outer hub 44 on the shaft. The outer hub 44 also has three equidistantly spaced slots 56 near the circumference of the hub 44, separating three radially extending lugs 57.

The locking hub 42 has the same diameter as the driving hub 44 and is located on the reel shaft 16 between the driving hub 44 and the sidewall 24 of the frame 12. The locking hub 42 has a center hole 58 of a slightly larger diameter than the reel shaft 16, allowing it to move rotationally and axially relative to the shaft. The locking hub 42 also has three lugs 60 located near the outer circumference of the hub 42 which protrude axially toward the driving hub 44. The lugs 60 which are equidistantly spaced and of the same angular width, fit into the slots 56 in the outer hub 44. The circumferential width of the slots 56 is greater than that of the lugs 60. This arrangement allows the locking hub 42 to be free to rotate through a small angular distance before the lugs 60 and 57 engage.

The coil spring 48 surrounds the reel shaft 16 and is located between the locking hub 42 and the frame sidewall 24. The locking hub 42 is biased by the calibration spring 48 against the driving hub 44 so that the lugs 57 and 60 are intermeshed. The strength of the spring determines the force required to move the locking hub axially, and hence determines the locking threshold.

Both hubs 42 and 44 contain a set of three recesses 62 and 64 located respectively between the lugs 60 and in the lugs 57 between the slots 56. Ball bearings 46 are captured within the facing recesses 62 and 64 between the hubs. Each recess is shaped such that a bearing 46 can rest within the recess but may also start to roll up the ramp in one direction along a ramp extending from the bottom of the recess to the hub axial face. While the recesses 62 and 64 on each of the hubs face each other, the ramps are oriented in opposite directions. Thus, when the hubs 42 and 44 turn relative to one another in one direction, the ball bearings 46 roll up the ramps, thereby separating the two hubs 42 and 44. When the hubs are together, the lugs 60 on the locking hub 42 are located at one circumferential end of the slots 56 in the outer hub 44. The combination of the calibration spring 48 and the ball bearings 46 in the recesses biases the locking hub 42 in this position. Preferably, the balls are made of nylon or other such material to minimize clicking noise during operation of the retractor. Such material is sufficiently strong, in that the balls do not feel a heavy load.

The locking hub also has a number of locking teeth 66, preferably nine, located near the outer circumference of the hub 42 on the side opposite from the lugs 60. The teeth 66 are circumferentially spaced and sized to fit into nine circumferentially spaced holes 68 in the sidewall 24 of the frame 12. The ring of holes is concentric with, but spaced outwardly from the central hole 28. The locking hub 42 is movable away from the outer hub 44 so that the teeth 66 fit into the holes 68 in a locked position. Each of the teeth 66 has a circumferentially flat, radially aligned, edge 66a and an inclined edge 66b. The edges are oriented in the same directions around the circumference of the locking hub 42. The edges 66a, which are generally perpendicular to the hub face, form the leading edges when the reel is rotated in a belt unwinding or payout direction. When the locking hub 42 is in the locked position, the edges 66a will prevent it from further rotation in the belt unwinding direction, while the inclined edges 66b will cause the hub 42 to disengage from the locked position upon rotation in the retraction direction.

Referring to FIG. 8 a synchronization spring 90 is shown positioned in the lower left corner of the cover or cap 50. More specifically, the spring has a tubular configuration formed by a plurality of axially aligned coils mounted in a socket 92 the cap 50, with the socket opening towards the frame side wall 24. A tangentially extending tang 90a on one end of the coil spring 90 is anchored in a slot 92a extending tangentially from the socket 92. A tang 90b on the opposite end of the coil spring 90 extends tangentially from the body of the coil and radially inwardly towards the reel shaft 16. More importantly, the tang 92b extends across one of the locking holes 68 in the reel side wall 24 in contact with the side wall, as may be seen in FIG. 9. Stated differently, the tang 90b lies in a radially extending plane adjacent the side wall 24.

As seen in FIG. 8, the free end of the tang 90b terminates at the radially inner edge of the ring of locking holes in the side wall. The spring tang 90b is of course flexible, and spring coils are slightly wound in the position shown in FIG. 8. Thus, the tang 90b is biased to move in an unwinding direction, but is restrained by a shoulder 92b of the socket sidewall. The end surface of the wall forming the shoulder 92b is flush with the end of the cap and thus engages the frame side wall. The shoulder is about the height of the diameter of the spring whereby the spring is maintained in engagement with the side wall 24. In installing the spring, the tang 90b is rotated slightly in a clockwise direction as shown in FIG. 8 and then retained by the shoulder 92b.

The reel shaft 16 has two axially elongated slots 74 and 76 that extend diametrically through the shaft between the sidewalls 22 and 24 of the frame 12. The slots 74 and 76 are located on opposite sides of the shaft 16 and meet in the center allowing a safety belt 78 to be inserted through the shaft 16. One slot 74 is wider than the other slot 76. The safety belt 78 terminates in a small loop into which an anchoring pin 80 is inserted. The pin 80, being of greater diameter than the width of slot 78, cannot fit through the smaller slot 76 in the reel shaft 16. However, the pin 80 does fit into the wider slot 74. Thus, the support pin 80 is captured within the wider slot 74 in the reel shaft 16 with the safety belt 78 extending through the smaller slot 76 and out the other side of the shaft 16. This causes the belt 78 to be secured onto the reel shaft 16 while at the same time ensuring that the belt rotates with the shaft.

Operation

When not in use, the belt 78 is coiled on the reel shaft 16, urged into that position by the power spring 30. This is the fully retracted position. The locking hub 42 and the driving hub 44 opposing faces are flush against one another, as seen in FIGS. 1 and 5, due to the force of the spring 48, and orientation of the ramp recesses causing the ball bearings 46 to be situated within the recesses 62 and 64 at the bottom of the ramps. The lugs 60 on the locking hub 42 are flush against one end of each of the spaces 56 adjacent one circumferential edge of the lugs 57 on the driving hub 44, as seen in FIG. 4.

If the belt 78 is extended from the retractor 10 relatively slowly, the coiled portion of the safety belt 78 begins to unwind. The reel shaft 16 and the locking assembly 18 rotate with the unwinding of the belt causing the torsion spring 30 to wind. The locking hub 42 is rotated by the bearings 46 in the recesses 62 and 64 in the position of FIG. 4. As seen from FIGS. 8 and 9, the synchronization spring does not interfere with the rotation of the locking hub. That is, the axial end face of each of the teeth is spaced slightly from the side wall slightly more than the diameter of the spring tang 90b, the locking hub being urged into that position by the coil spring 48. The winding of the torsion spring 30 provides torque on the reel shaft 16 in the opposite direction to the uncoiling motion so that when the belt 78 is released, it retracts onto the reel shaft 16.

If the belt 78 is extended very quickly or suddenly, as in an emergency situation, the locking hub 42, which rotates freely on the shaft 16, tends to lag behind the rotation of the outer hub 44 due to the rotational inertia of the locking hub 42. The mass of the locking hub is considerable in view of its lugs extending on one face, and axially extending teeth on the other face. As the locking hub 42 lags the outer hub 44 rotationally, the lugs 60 slide along the slots 56 in the outer hub 44 toward the other circumferential end of the slots 56, as seen in FIG. 6. The relative rotation also causes the bearings 46 between the hubs 42 and 44 start to roll up the ramps in the recesses 62 and 64, as seen in FIG. 7, thereby pushing the locking hub 42 axially toward the sidewall 24 of the frame 12 against the force of the spring 48. The components in effect form a clutch. The spacing of the components is such that the bearings 46 cannot roll completely out of the recesses 62 and 64.

As the locking hub starts to move axially it can be at any rotational position relative to the locking holes in the frame side wall. If the locking teeth were just starting into engagement with the locking edges of the locking holes, the locking teeth of the locking hub could engage but slip past the locking hole. Such action could damage the teeth, and would slightly delay the locking of the reel in that the locking hub would rotate until the teeth are aligned with the next holes.

Figure 13:
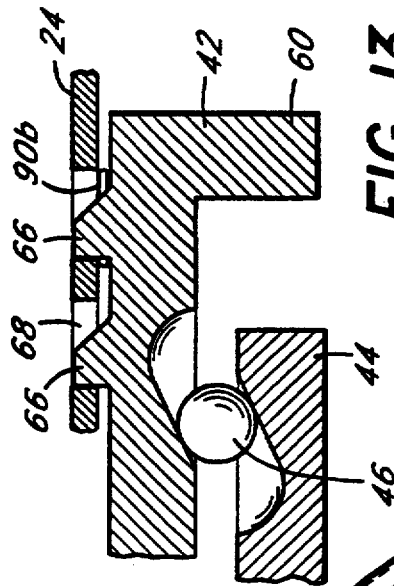
FIG. 13 is a cross-sectional view on line 13—13 of FIG. 12.
Figure 12:
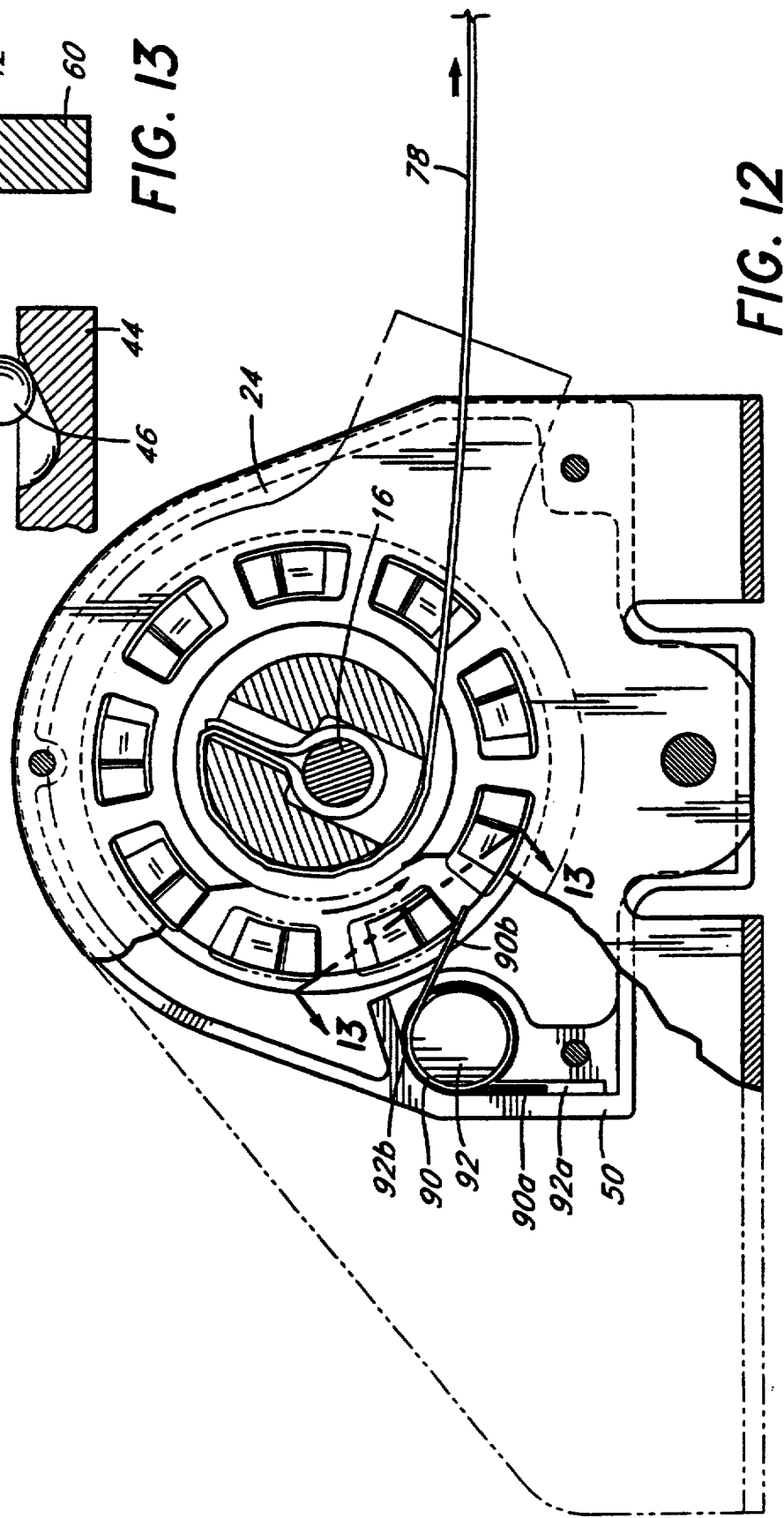
FIG. 12 is a cross-sectional view similar to FIGS. 8 and 10 but with the locking hub moved into locking position.

The flexible synchronization element in the form of the spring tang 90b eliminates this problem by guiding the locking teeth into position with the locking holes. More specifically, as the locking hub is moved towards the side wall, while still rotating, one of the locking teeth will circumferentially engage the flexible element 90b, as shown in FIGS. 10 and 11, and will arrest or slow the rotation of the locking hub. This will result in the flexible element moving slightly in the belt unwinding direction to align the locking teeth with the locking holes. The locking teeth can then be moved axially fully into the locking position as shown in FIGS. 12 and 13. Note that the flexible finger has moved from its generally radially oriented position of FIG. 8 to a deflected position shown in FIG. 12 wherein the synchronization spring has been wound more tightly. With this arrangement, all of the locking teeth are synchronized with the locking holes so that the locking teeth are guided smoothly and quickly into locking position.

It can also be recognized from FIG. 12, that if the locking teeth were not in a locking hole but yet were engaging the flexible element 90b, the locking hub could continue to move without damaging the locking element in that the flexible element would simply ratchet against the locking teeth as they rotated by. That is, the synchronization spring would not be damaged in such an unusual situation. To accomplish this, the spring needs the proper characteristics and the free end of the tang 90b should terminate adjacent the inner diameter of the locking hole ring as shown in FIG. 8. This seems to be the preferred arrangement since the flexible tang performs its desired function of fully engaging the edge of a locking tooth to restrain the locking hub and yet is sufficiently short to permit the rachetting. When the locking hub retracts to its unlocked position, the spring tang 90b is of course free to snap back to its original position of FIG. 8.

With the locking hub teeth 66 fitting within the holes 68 the edges 66a engaging the hole edges in the sidewall 24 prevent further rotation of the locking hub 42, as seen in FIG. 7. The lugs 60 engaging the lugs 57, as seen in FIG. 6, prevent further unwinding rotation of the outer driving hub 44. Transmitting the locking load through the heavy lugs 60 and 57 advantageously bypasses the bearings 46 and recesses 62 and 64. The locked driving hub, in turn, prevents further rotation of the reel 16, as well as further uncoiling of the belt 78. This will restrain the occupant from moving forward when the vehicle rapidly decelerates. The torque on the reel shaft 16 caused by the tension in the belt 78 will cause the locking hub 42 to remain held in the locked position. When the belt relaxes, the torsion spring 30 begins to recoil the belt 78 back onto the reel shaft 16. The ball bearings 46 transmit this lighter torque to the locking hub 42. Since the teeth 66 have inclined surfaces 66b in the direction of the recoil rotation, they are automatically urged axially and disengaged from the frame 12. The locking hub 42 is pushed axially back into its initial position against the outer hub 44 by the spring 48.

One of the advantages of the invention is that the belt locking load is transmitted directly to the retractor frame 12 without the need for an additional structure attached to the frame. Related to that is the fact that the locking lugs 66 on the locking hub 60 fit directly into the mating holes 68 in the frame sidewall 24. With this arrangement, the sidewall 24, with its central hole 28 is available to serve as a support for the shaft assembly 16. Further reducing the number of parts required is the use of the annular wall 88 forming a bearing for the shaft 16 while being integral with the belt guide 14.

What is claimed is:

1. A restraint belt retractor comprising:
  a frame having a pair of spaced side walls, one of said side walls having a ring of spaced locking holes;
  a shaft rotatably mounted within the side walls for supporting a restraint belt, said ring of locking holes being concentric with but spaced radially outwardly from said shaft;
  a driving hub fixed to said shaft spaced axially outwardly from said one side wall, said hub having a plurality of radially extending, circumferentially spaced lugs;
  a locking hub having a plurality of circumferentially spaced lugs that extend axially into spaces between said driving hub lugs, the spaces between said driving hub lugs being circumferentially greater than the circumferential dimension of said locking hub lugs so as to permit limited relative rotation between said hubs, said locking hub having a ring of spaced teeth that extend axially toward said frame locking holes, the teeth being sized to fit within said locking holes, said locking hub being moveable axially from an unlocked position wherein said hub teeth are spaced from said frame locking holes into locked position wherein the hub teeth are in said locking holes;
  a plurality of spaced ramped recesses formed in an axial wall of said driving hub lugs facing said locking hub, a plurality of spaced mating recesses in said locking hub facing said driving hub and being positioned between said locking hub lugs, a plurality of rolling elements captured between the recesses of said hubs, said recesses and said elements being constructed to cause said elements to start to roll out of said recesses and to move said locking hub axially into said locked position when said locking hub rotationally lags said driving hub, said driving hub and said locking hub lugs being spaced so that when said locking hub is in its unlocked position, rotation of said driving hub in a belt unwinding direction is transmitted through said rolling elements and recesses rather than through said lugs;
  a spring urging said locking hub into its unlocked position; and
  an elongated flexible element extending perpendicular to the shaft in a radial plane adjacent said one frame side wall across said ring of holes to arrest rotation of said locking hub teeth and align them with said holes for axial movement into the holes.

2. A restraint belt retractor comprising:
  a frame having a pair of spaced side walls, one of said side walls having a ring of spaced locking holes;
  a shaft rotatably mounted within the side walls for supporting a restraint belt, said ring of locking holes being concentric with but spaced radially outwardly from said shaft;

a driving hub fixed to said shaft spaced axially outwardly from said one side wall, said hub having a plurality of radially extending, circumferentially spaced lugs;

a locking hub having a plurality of circumferentially spaced lugs that extend axially into spaces between said driving hub lugs, the spaces between said driving hub lugs being circumferentially greater than the circumferential dimension of said locking hub lugs so as to permit limited relative rotation between said hubs, said locking hub having a ring of spaced teeth that extend axially toward said frame locking holes, the teeth being sized to fit within said locking holes, said locking hub being moveable axially from an unlocked position wherein said hub teeth are spaced from said frame locking holes into locked position wherein the hub teeth are in said locking holes;

a plurality of spaced ramped recesses formed in an axial wall of said driving hub lugs facing said locking hub, a plurality of spaced mating recesses in said locking hub facing said driving hub and being positioned between said locking hub lugs, a plurality of rolling elements captured between the recesses of said hubs, said recesses and said elements being constructed to cause said elements to start to roll out of said recesses and to move said locking hub axially into said locked position when said locking hub rotationally lags said driving hub, said driving hub and said locking hub lugs being spaced so that when said locking hub is in its unlocked position, rotation, of said driving hub in a belt unwinding direction is transmitted through said rolling elements and recesses rather than through said lugs;

a spring urging said locking hub into its unlocked position; and a flexible element extending in a radial plane adjacent said one frame side wall across said ring of holes to arrest rotation of said locking hub teeth and align them with said holes for axial movement into the holes; and a cap enclosing said hubs, a coil spring mounted in said cap and having one end tang anchored in said cap, and an opposite end tang forming said flexible element.

3. A restraint belt retractor comprising:

a wall having a ring of spaced locking holes formed therein;

a shaft rotatably mounted in said wall with said ring of locking holes being spaced radially outwardly from said shaft;

a locking hub rotatably mounted on said shaft having a ring of spaced teeth that extend axially towards said frame locking holes, said locking hub being movable axially from an unlocked position wherein said hub teeth are spaced from said locking holes into locked position wherein the hub teeth are in said locking holes;

a mechanism moving said hub axially into said locked position in an emergency situation; and an elongated flexible synchronization element extending generally radially, perpendicular to the shaft adjacent said wall and across said ring of locking holes, one end of said element being anchored and the other end of said element being free to flex in a radial plane about an axis generally parallel to said shaft, said locking hub teeth being positioned to rotate adjacent to said element when said locking hub is in its unlocked position, but said locking hub teeth being moved into said plane as the locking hub is moved axially from its unlocked position towards its locked position, said element being adapted to arrest rotation of said locking hub as it is moving axially to thereby guide the locking teeth into said frame locking holes.

4. The retractor of claim 3, wherein said element is sufficiently flexible to permit said locking hub teeth to deflect and rotate past said element if there is sufficient torque applied to said locking hub while the locking hub teeth are in the plane of said element.

5. A restraint belt retractor comprising:

a wall having a ring of spaced locking holes formed therein;

a shaft rotatably mounted in said wall with said ring of locking holes being spaced radially outwardly from said shaft;

a locking hub rotatably mounted on said shaft having a ring of spaced teeth that extend axially towards said frame locking holes, said locking hub being movable axially from an unlocked position wherein said hub teeth are spaced from said locking holes into locked position wherein the hub teeth are in said locking holes;

a mechanism moving said hub axially into said locked position in an emergency situation; and a flexible synchronization element extending in a radial plane adjacent said wall and across said ring of locking holes, one end of said element being anchored and the other end of said element being free to flex in said radial plane, said locking hub teeth being positioned to rotate adjacent to said element when said locking hub is in its unlocked position, but said locking hub teeth being moved into said plane as the locking hub is moved axially from its unlocked position towards its locked position, said element being adapted to arrest rotation of said locking hub as it is moving axially to thereby guide the locking teeth into said frame locking holes, said element being an end tang of a coil spring.

6. The retractor of claim 5, including an end cap which fits over said hub and mounts on said wall, said cap including a socket in which said coil spring is mounted with a tang on one end of the spring being anchored in said cap and a tang on the other end of said spring forming said flexible element.

7. In a restraint belt retractor, including a frame having a ring of spaced locking holes, a belt shaft rotatably mounted in said frame, a locking hub rotatably mounted on said shaft, said locking hub having a ring of spaced teeth that extend axially towards said frame locking holes, said locking hub being movable axially from an unlocked position wherein said hub teeth rotate adjacent to but spaced slightly from said frame into a locked position wherein said hub teeth extend into said frame locking holes, a method of assisting said locking hub teeth from moving into locking position comprising:

positioning a flexible element generally perpendicular to the shaft in a radial plane between said frame ring of locking holes and said ring of locking teeth, with said element extending generally radially across said ring of locking holes to be in the rotational path of said locking teeth when said locking hub is moved axially towards said frame; and restraining rotation of said locking hub with said element in a manner such that said locking teeth are rotationally synchronized with said locking holes so as to move smoothly axially into said locking holes.

8. The method of claim 7, including forming said element as a flexible spring having one end anchored and a free end engaged by said locking teeth and adapted to flex out of the path of said teeth if said hub is subjected to sufficient torque.

9. In a restraint belt retractor, including a frame having a ring of spaced locking holes, a belt shaft rotatably mounted in said frame, a locking hub rotatably mounted on said shaft, said locking hub having a ring of spaced teeth that extend axially towards said frame locking holes, said locking hub being movable axially from an unlocked position wherein said hub teeth rotate adjacent to but spaced slightly from said frame into a locked position wherein said hub teeth extend into said frame locking holes, a method of assisting said locking hub teeth from moving into locking position comprising:

positioning a flexible element in a radial plane between said frame ring of locking holes and said ring of locking teeth, with said element extending generally radially across said ring of locking holes to be in the rotational path of said locking teeth when said locking hub is moved axially towards said frame; restraining rotation of said locking hub with said element in a manner such that said locking teeth are rotationally synchronized with said locking holes so as to move smoothly axially into said locking holes;

enclosing said locking hub in a cap which attaches to said frame and positioning a synchronizing spring in a socket within said cap with a tang on one end of said spring being anchored in said cap and a tang on the opposite end of said spring extending radially inwardly to form said flexible element.

10. The method of claim 9, including positioning said element so that the hub locking teeth can deflect said element and allow said locking hub teeth to rotate past said element when the locking hub is subjected to sufficient torque.

* * * * *